United States Patent

Carpenter et al.

[11] Patent Number: 5,807,601
[45] Date of Patent: Sep. 15, 1998

[54] IMITATION CHEESE COMPOSITION AND PRODUCTS CONTAINING STARCH

[75] Inventors: Robert N. Carpenter, Prior Lake, Minn.; Kevin J. Finnie, Green Bay, Wis.; Robert L. Olsen, Tempe, Ariz.

[73] Assignee: Schreiber Foods, Inc., Green Bay, Wis.

[21] Appl. No.: 711,241

[22] Filed: Sep. 9, 1996

[51] Int. Cl.⁶ .................................................. A23L 20/02
[52] U.S. Cl. ....................... 426/578; 426/582; 426/585; 426/602; 426/613
[58] Field of Search ..................... 426/578, 582, 426/585, 602, 613

[56] References Cited

U.S. PATENT DOCUMENTS

| | | |
|---|---|---|
| 2,923,628 | 2/1960 | Otto . |
| 3,397,994 | 8/1968 | Elenbogen et al. . |
| 3,397,995 | 8/1968 | Elenbogen . |
| 3,615,661 | 10/1971 | Ellinger . |
| 3,620,757 | 11/1971 | Ellinger . |
| 3,806,606 | 4/1974 | Selden . |
| 3,891,777 | 6/1975 | Boyer . |
| 3,922,374 | 11/1975 | Bell et al. . |
| 4,104,413 | 8/1978 | Wynn et al. . |
| 4,143,175 | 3/1979 | Whelan et al. . |
| 4,199,608 | 4/1980 | Gilmore et al. . |
| 4,219,583 | 8/1980 | Igoe . |
| 4,499,116 | 2/1985 | Zwiercan et al. . |
| 4,552,774 | 11/1985 | Gronfor . |
| 4,608,265 | 8/1986 | Zwiercan . |
| 4,684,533 | 8/1987 | Kratochvil . |
| 4,695,475 | 9/1987 | Zwiercan et al. . |
| 4,859,484 | 8/1989 | Bielskis et al. . |
| 4,885,183 | 12/1989 | Strandholm et al. . |
| 4,937,091 | 6/1990 | Zallie et al. . |
| 4,956,193 | 9/1990 | Cain et al. . |
| 5,211,978 | 5/1993 | Merkenich et al. . |
| 5,234,707 | 8/1993 | Merkenich et al. . |
| 5,279,844 | 1/1994 | Wesdorp et al. . |
| 5,338,560 | 8/1994 | Wesdorp et al. . |
| 5,486,375 | 1/1996 | Yoder et al. .............................. 426/578 |

OTHER PUBLICATIONS

De Coninck, Valère, "Starch as a Functional Ingredient in Food Processing," Jun. 1990, 23 pages.

Morris, V. J., "Starch Gelation and Retrogradation," Trends in Food Science & Technology, Jul. 1990, pp. 2–6.

Hegenbart, Scott, "Stifting Through Starches to Maximize Performance," Food Product Design, Sep. 1993, pp. 35, et seq.

*Primary Examiner*—Helen Pratt
*Attorney, Agent, or Firm*—Steven P. Shurtz; Brinks Hofer Gilson & Lione

[57] ABSTRACT

An imitation cheese composition is made with less than 2% protein and/or less than 1% casein protein and comprises a) about 3% to about 30% starch; b) about 0% to about 30% edible lipid material; c) about 20% to about 60% water; d) about 0.5% to about 25% non-starch carbohydrates; and e) about 0.5% to about 5% hydrocolloid stabilizers; and optionally contains up to about 2% cheese flavor and up to about 2% color.

35 Claims, No Drawings

IMITATION CHEESE COMPOSITION AND PRODUCTS CONTAINING STARCH

BACKGROUND OF THE INVENTION

This invention relates to imitation cheese products, such as cheddar, processed American and mozzarella cheeses, wherein the casein sources are replaced by starches.

Early attempts to reduce cheese costs led to the development of cheese analogs in which vegetable fat replaced the more costly milk fat. Such analogs were usually manufactured by traditional methods from skim milk containing dispersed vegetable fats and were generally referred to as "filled" cheeses. These analogs generally included casein. Casein is the protein, naturally found in milk, that gives the functional characteristics found in the majority of traditional cheese varieties. Cheese analogs have been produced from a variety of casein sources such as cottage cheese, skim milk and the like. In many instances, the casein source has been combined with minor amounts of the cheese being simulated and acts as an extender therefor.

Later economic incentives and technical advances led to the development of fabricated cheese analogs manufactured fundamentally from acid or rennet coagulated casein or its derivatives, such as the caseinates made by reacting caseins with alkali or inorganic emulsifier salts. The analogs also included vegetable fats or oils, salts, acids and flavorings. Since acid or rennet coagulated casein and its derivatives are legally defined as nondairy ingredients, the fabricated analogs were referred to as "imitation" cheeses.

Imitation cheese products include very hard varieties such as parmesan and romano; hard varieties such as cheddar, mozzarella and provolone; semisoft varieties such as blue cheese; soft varieties such as cream cheese; and pasteurized processed cheese such as American cheese, cheese foods and spreads and cheese products. These imitation cheese products provide the flavor and functionality of natural cheese at a reduced cost and, in addition, are lower both in saturated fat and cholesterol since the animal fat has been replaced by vegetable fat.

Sodium, calcium and potassium caseinates have been used in the production of imitation cheese products, as illustrated by U.S. Pat. No. 4,104,413 to Wynn et al. However, such caseinates sometimes possess an objectionable odor and flavor which can override the intended flavor of the imitation cheese product. Another drawback of caseinates is that they are relatively expensive.

Caseinates may be formed in situ by the reconstitution of previously dry casein which has been made by either the rennet or acid coagulation of skim milk. U.S. Pat. No. 4,444,800 to Bixby et al. discloses a process for the manufacture of a simulated cheese product using dry rennet casein as the casein source. In this process, inorganic emulsifying agents such as sodium citrate and phosphates are employed to rehydrate the dry, granular rennet casein in water using sufficient heat and agitation. Additional ingredients such as lipids, flavors and preservatives may be incorporated to give additional cheese like properties. In a similar manner, dry, granular acid coagulated casein may be reconstituted to give a suitable imitation cheese product as evidenced by U.S. Pat. No. 3,922,374 to Bell et al.

The current high cost and uncertain future availability of casein and caseinates have become a major concern to food processors. For these reasons, the processors have been trying to find a readily available casein substitute, preferably a low cost substitute, to partially or totally replace the casein sources in imitation cheese products.

There are products which are sold as cheese substitute that do not contain casein. For example, "VEGAN RELLA"™ is a product sold by Sharon's Finest, Santa Rosa, Calif., as a healthy cheese alternative. Its ingredients include brazil nuts, tapioca, rice, oats, canola oil and Irish moss. Another cheese alternative is "SOYMAGE"™, sold by Soyco Foods, Orlando, Fla. Its ingredients include soy milk (water, organic tofu), soy protein isolate, canola oil, soy lecithin and guar gum. One problem with these cheese alternatives is that they do not have the body, texture and eating qualities (such as flavor) of natural dairy cheese. Further, these products are more expensive than common imitation cheese.

U.S. Pat. Nos. 4,608,265 and 4,695,475 document numerous caseinate replacements for imitation cheese, and disclose the use of pregelatinized high amylose starches for partial or total replacement of caseinates. These patents conclude that total replacements of caseinate requires the use of pregelatinized high amylose starches.

U.S. Pat. No. 5,486,375 discloses the use of granular (non-pregelatinized) hydroxypropylated, high amylose starch as a component of a caseinate replacement composition for imitation cheese. According to the patent, the composition can be used to replace up to about 70% by weight of the caseinate used in imitation cheese.

One problem with the compositions disclosed in these patents is that the starches that are used require extensive pretreatment operations, such as pregelatinization or hydroxypropylation, which adds to their cost. Thus, even with all this work, there is still a need for an imitation cheese composition that is essentially free of casein, and preferably relatively free of other proteins as well, that can use inexpensive modified or native starches.

SUMMARY OF THE INVENTION

Applicants have discovered imitation cheese compositions which can be made with inexpensive starches and with no casein and no or very little other protein.

In a first aspect, the invention is an imitation cheese composition comprising about 3% to about 30% starch, preferably a granular starch; about 0% to about 30% edible lipid material; about 20% to about 60% water; about 0.5% to about 25% non-starch carbohydrates; and about 0.5% to about 5% hydrocolloid stabilizers; wherein the composition contains less than 2% protein.

In a second aspect, the invention is an imitation cheese composition having the body, texture and eating qualities of natural dairy cheese comprising about 3% to about 30% starch; about 0% to about 30% edible lipid material; about 20% to about 60% water; about 0.5% to about 25% non-starch carbohydrates; and about 0.5% to about 5% hydrocolloid stabilizers; wherein the composition contains less than 1% casein protein.

By replacing all of the casein in the imitation cheese, low cost products can be made. With the present invention, such products can be made using readily available and relatively inexpensive native or modified starches. Preferably the products still have the body, texture and eating qualities of the natural dairy cheese that they imitate.

DETAILED DESCRIPTION OF THE PRESENTLY PREFERRED EMBODIMENTS

Unless otherwise stated, all percentages herein are weight percentages.

As used herein the term "imitation cheese" is intended to refer to any cheese analog.

Caseins and caseinates are well known as protein sources. Caseinates are usually sodium, potassium or calcium caseinate, which are the salts generated by treating acid casein and rennet casein with alkali or an inorganic emulsifier. As used herein, the term "casein protein" includes casein in all its forms, including rennet casein, acid casein, caseinates, and casein in its native form as found in milk. As noted above, the present invention includes imitation cheese compositions that are essentially free of casein protein or relatively low in dairy proteins and preferably low in protein of any kind. Preferred composition have less than 1% casein protein and/or less than 2% dairy protein, and preferably less than 2% protein of any type. This low protein/casein content helps to keep the cost of the imitation cheese to a minimum.

The starch used in the present invention is preferably granular in structure. This means it is not subject to a pregelatinization step where the starch is cooked up in water and then dried. The term "granular" means that the starch has substantially retained or completely retained its granular structure and has not been pre-cooked. The terms "granular starch" and "pregelatinized starch" are well-known to those of ordinary skill in the art. The preferred starch of the present invention is not pregelatinized.

Suitable starches include starch from corn, potato, sweet potato, wheat, rice, sago, tapioca, sorghum and other inexpensive starch sources. The starches used in the present invention may be native starches, which means the starch has not been modified, or modified starches. Starches may be modified to provide a variety of technical functions, including reducing or increasing the viscosity of the starch solution and increasing the stability of starch solutions during cook-up, shearing, cold storage or the freeze/thaw cycle. The preferred starches are acid converted starches providing a decreased viscosity of the solution during cook-up. Because of the acid conversion, the decreased viscosity produces a benefit of low viscosity in processing, but results in a more rigid gel upon cooling, which is desirable for the imitation cheese product to resemble the cheese being simulated. Starches with modifications involving cross-linking, stabilization or oxidation alone or in combination may be used but, with an increased degree of modification, their cost is higher and their benefit as an economical replacement for the casein source is negated. Cross-linking is the process of connecting two starch molecular chains with a chemical agent for the purpose of stabilizing the granules to lower the viscosity and to give increased stability where the starch will be cooked under high heat or shear or acidic conditions. Stabilization is a modification where the cross-linked starch is rendered stable to refrigerated or frozen temperatures by the use of chemical reagents. Oxidation of the aqueous starch solution with sodium hypochlorite reduces the viscosity, and gives a stable, clear solution.

Some of the types of modified starches that may be used in the present invention include:

1) converted starches consisting of acid or enzyme treated starch;
2) stabilized starches made by treatment with reagents consisting of succinic anhydride, octenylsuccinic anhydride, acetic anhydride, sodium or potassium orthophosphate, or sodium or potassium tripolyphosphate;
3) oxidized starches made by the reaction of the starch with sodium hypochlorite; and
4) cross-linked starches wherein the cross-linking reagents consist of phosphorous oxychloride, sodium trimetaphosphate or adipic anhydride.

Preferably the starches will have a water fluidity of between about 5 and about 90, more preferably between about 40 and 90, even more preferably between about 40 and about 70, and most preferably about 65. In some formulations, a combination of two or more different starches may be beneficial. Preferred starches have an amylose content of less than 40%, and more preferably less than 30%. A particularly preferred starch is modified food starch TB65 from Roquette America, Keokuk, Iowa, having a water fluidity of about 65 and an amylose content of about 25%.

The amount of starch used in the imitation cheese of the present invention will depend on the functional characteristics required for the cheese. For imitation cheese products that do not need to melt, such as shreds used at a salad bar, the level of starch can be quite high, up to 30% of the composition. Where the product needs to have good melt properties, lower levels will probably be used, in the range of 3–5%. For a salad bar cheese, the starch preferably comprises about 10 to about 30% of the imitation cheese, and more preferably about 12% to about 25% of the composition. Most preferably the starch will comprise about 15% to about 20% of the composition used as a salad bar shred.

In addition to the starch, it has been found that a number of other ingredients, some of which are used at relatively low levels, are necessary to allow the use of the inexpensive starches while still making an imitation cheese which has the body, texture and eating qualities, including mouth feel, of natural dairy cheese. In addition to water, these include non-starch carbohydrates and hydrocolloid stabilizers. Other ingredients are also preferably added, such as lipid materials, low levels of dairy proteins, cheese flavor, color and a preservative.

As with all imitation cheese compositions, a large amount of water is present in the imitation cheese of the present invention. The water is often partially added in the form of steam while the other ingredients are mixed, thus also providing heat for the mixing process. The water content of the imitation cheese of the present invention will be between about 20% and about 60%, preferably between about 35% and about 60%, and most preferably between about 45% and about 55%.

The dairy protein can include small amounts of caseins or caseinates, although preferably the composition has no casein. The small amount of dairy proteins have been found to help disperse lipid material. Other protein sources such as soy protein might also aid dispersion. Preferably the dairy protein is whey protein, which is readily available in various sources, including liquid whey, whey powder, condensed whey, whey protein isolate, whey protein solids, reduced lactose whey, reduced minerals whey and whey protein hydrolyzate. When used, the dairy protein is included at a level of between about 0.5% but less than 2%. Preferably whey protein comprises about 1.0% to about 1.8% of the imitation cheese composition. When the dairy protein is provided as a dried, sweet whey powder, the powder will preferably comprise about 5% to about 15% of the composition. A preferred source of the dairy protein is Teklac whey powder from Foremost-Wisconsin Dairy, Baraboo, Wis.

The non-starch carbohydrates are primarily used as fillers. Starch is a carbohydrate, but has a functional use in the composition. The non-starch carbohydrates, being used as fillers, do not provide any particular functional characteristics other than bulk. Preferred non-starch carbohydrates include corn syrup solids (which may be added as corn syrup, thus contributing to the water content of the composition), dextrose, sucrose, lactose, maltose, maltodextrin and combinations thereof. Since both whey and whey powder include high levels of lactose, the addition of either ingredient will provide both whey protein and non-starch carbohydrates.

The preferred non-starch carbohydrates are a combination of 36 D.E. corn syrup solids from Roquette America, Keokuk, Iowa and Maltrin 100 maltodextrin from Grain Processors Corporation, Muscatine, Iowa.

The non-starch carbohydrate will comprise about 0.5% to about 25% of the imitation cheese composition, and more preferably about 5% to about 20% of the composition. In one embodiment, the non-starch carbohydrate is corn syrup solids comprising about 10% of the composition.

The hydrocolloid stabilizers are used to enhance the texture of the imitation cheese, and work in conjunction with the starches to achieve this affect. The preferred hydrocolloid stabilizers are natural gums and modified gums.

The natural gums include extracts from seaweed, plant exudates, seed or root gums and gums obtained from microbial fermentation. Modified gums include derivatives of natural gum and certain synthetic gums. Any conventional source of such gum can be used so long as the gum is suitable for use in food. Suitable natural gums for use in the present invention include agar, algin, carrageenan, guar gum, gum arabic, gum ghatti, gum tragacanth, karaya gum, locust bean gum, pectin and xanthan gum. Suitable modified gums include cellulose derivatives such as sodium carboxymethylcellulose, microcrystalline cellulose, methylcellulose; pectin derivatives such as low-methoxyl pectin; alginates such as propylene glycol alginate, triethanol-amine alginate; carboxymethyl locust bean gum; gellan gum and carboxymethyl guar gum. One preferred hydrocolloid stabilizer for use in the present invention is a combination of xanthan gum and locust bean gum available from Kelco Co., San Diego, Calif. sold under the trademark "KELGUM." A blend of konjac gum and kappa carrageenan may be preferred in some compositions. Another preferred hydrocolloid stabilizer is a combination of guar gum, locust bean gum and carrageenan available as Crest #649 from Crest Foods Co., Inc., 905 Main Street, Ashton, Ill.61006.

The hydrocolloid stabilizer will constitute about 0.5% to about 5% of the imitation cheese composition, and preferably about 0.5% to about 2.5% of the composition.

Normally the imitation cheese composition will include an edible lipid material. However, fat-free products are becoming more popular and are within the scope of the present invention. When a lipid material is present, it will typically constitute up to about 30% of the composition. Preferably the composition will contain about 10% to about 25%, and more preferably about 15% to about 20% edible lipid material. Common edible lipid materials that may be used include butter as well as fats and oils from corn, sesame, cottonseed, safflower, coconut, soybean, olive, palm, sunflower and rapeseed. The lipid materials may be hydrogenated. A preferred edible lipid material is a partially hydrogenated soybean oil having a Wiley melting point of 93° F.

Cheese flavors and colors are well known and selected based on subjective preferences. The present invention will typically use artificial color and cheese flavors up to levels of about 2% of the composition. If the color or flavor are added as part of a coloring or flavoring composition in which the color or flavor are diluted, then of course greater amounts of these composition would be necessary to give the desired active amount of color or flavor. Small amounts of highly flavored cheese, such as enzyme modified cheese, may be added to provide flavor. However, because such cheese contains casein protein, in the present invention it will be used at very low levels.

The product does not need conventional emulsifying salts (phosphates, citrates, etc.) to condition the casein, but such salts may be added for other effects, such as preservation. An emulsifying salt, such as sodium hexameta-phosphate, sodium tripolyphosphate, tetrasodium pyrophosphate, trisodium phosphate or disodium phosphate, is preferably included.

Because the imitation cheese of the present invention preferably excludes casein, an acidulant is not necessary. However, typical acidulants found in imitation cheese compositions may be used in some compositions.

The preparation and formulation of imitation cheese is conventional and well-known to those of ordinary skill in the art. Imitation cheeses which can be made include imitation mozzarella, processed American, cheddar, and cream cheese as well as various cheese spreads. There are known variations for the different types and both formulation and process to make differ from manufacturer to manufacturer. Typically, all ingredients are mixed together, then heated for a short period of time, formed into a shape and finally refrigerated.

A general process of making the composition of the present invention into shreds, slices and other imitation cheese products is as follows. The edible lipid material is first blended with dry ingredients. Then the water is added slowly with mixing to disperse lumps. (Dry ingredients may be added to the water if done carefully so that the gums are well dispersed.) The mass is injected with steam while mixing until it reaches a temperature of about 180° F., which is required to cook the starch. The hot mass is pumped into large polypropylene lined boxes and cooled for a couple of days before it is shredded. Alternatively, the imitation cheese may be filled into small (5 lb. or less) loaves for use by the consumer or may be extruded into wrapped, single slice forms. The imitation cheese, at lower moisture levels, may possibly be cast into slices for either institutional or retail markets.

These and other aspects of the present invention may be more fully understood by reference to the following examples.

EXAMPLE 1

A cheddar style imitation cheese product was made according to the following formula.

|  | Percent |
|---|---|
| Enzyme Modified Cheese | .26 |
| Whey Powder (Teklac)[D] | 9.04 |
| Modified Food Starch (TB65)[A] | 18.08 |
| Corn Syrup Solids (dri-sweet 36)[A] | 4.52 |
| Xanthan-Locust Bean Gum (Kelgum)[B] | 1.29 |
| Maltodextrin (Maltrin 100)[C] | 4.52 |
| Sodium Hexametaphosphate | 0.30 |
| Artificial Flavor | 0.01 |
| Salt | 1.99 |
| Sorbic Acid | 0.20 |
| Artificial Color | 0.11 |
| Partially Hydrogenated Soybean Oil | 15.12 |
| Water/Steam | 44.56 |
|  | 100.00 |

[A]Roquette America, Keokuk, IA
[B]Kelco Co., San Diego, CA

|   |   |
|---|---|
| | Percent |

$^C$Grain Processors Corporation, Muscaine, IA
$^D$Foremost - Wisconsin Dairy, Baraboo, WI The oil was melted and added to a double auger Reitz cooker. The color was then added to the oil. Next the whey powder, modified food starch, corn syrup solids, Kelgum, Maltrin 100, sodium hexametaphosphate, salt, sorbic acid, enzyme modified cheese and flavor were added to the mixer and mixed for about a minute with the augers on low speed until the mixture was homogeneous.

About 82% of the water was added as a liquid and steam was then fed to the mixer to provide the remainder of the water. The mixture was heated to 185° F. while being mixed on low speed for about 1 minute. The resulting homogeneous mixture was then discharged from the mixer and cooled to form the imitation cheese.

As noted earlier, if an imitation cheese with good melt properties is desired, generally lower levels of starch will be used. A Schreiber Melt Test score of 3 or better generally indicates that a cheese product has good melt properties.

EXAMPLE 2

A formula that may be used to produce an imitation cheese with good melt properties is as follows:

| | |
|---|---|
| Starch | 3–5% |
| Xanthan - Locust Bean Gum (Kelgum) | 1.3% |
| Maltodextrin | 10% |
| Water | 48% |
| Hydrogenated Vegetable Oil | 25% |
| Dried Sweet Whey Powder | 8–9% |
| Color, Preservatives and Flavor | as needed |

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. An imitation cheese composition comprising:
   a) about 3% to about 30% granular starch;
   b) about 0% to about 30% edible lipid material;
   c) about 20% to about 60% water;
   d) about 0.5% to about 25% non-starch carbohydrates; and
   e) about 0.5% to about 5% hydrocolloid stabilizers;
   f) wherein the composition contains less than 2% protein.

2. The imitation cheese composition of claim 1 wherein the composition contains less than 1% casein protein.

3. The imitation cheese composition of claim 1 wherein the starch is a native starch.

4. The imitation cheese composition of claim 1 wherein the hydrocolloid stabilizer comprises a mixture of xanthan gum and locust bean gum.

5. The imitation cheese composition of claim 1 wherein the starch has a water fluidity of between about 5% and about 90%.

6. The imitation cheese composition of claim 1 having a Schreiber Melt Test score of 3 or greater.

7. The imitation cheese composition of claim 1 comprising about 0.5 to less than 2% whey protein.

8. The imitation cheese composition of claim 7 wherein the whey protein is added to the composition in the form of dried sweet whey powder.

9. The imitation cheese composition of claim 1 wherein the granular starch is a modified starch selected from the group consisting of stabilized starches, cross-linked starches, acid converted starches, enzyme converted starches, oxidized starches and mixtures thereof.

10. The imitation cheese composition of claim 1 wherein the non-starch carbohydrate is selected from the group consisting of corn syrup solids, maltodextrin, dextrose, sucrose, lactose, maltose and combinations thereof.

11. The imitation cheese composition of claim 1 having the body, texture and eating qualities of natural dairy cheese.

12. The imitation cheese composition of claim 1 wherein the starch has a water fluidity of between about 40 and 90.

13. The imitation cheese composition for claim 1 wherein the starch has a water fluidity of between about 40 and 70.

14. An imitation cheese product having the composition of claim 1 and made into an individually wrapped slice.

15. An imitation cheese product having the composition of claim 1 and made into imitation cheese shreds.

16. An imitation cheese product having the composition of claim 1 and made into a loaf of imitation cheese.

17. The imitation cheese composition of claim 1 wherein the starch is a converted starch made by acid or enzyme treatment.

18. The imitation cheese composition of claim 1 wherein the starch is a stabilized starch made by treatment with reagents selected from the group consisting of succinic anhydride, octenylsuccinic anhydride, acetic anhydride, sodium ortho phosphate, potassium orthophosphate, sodium tripolyphosphate and potassium tripolyphosphate.

19. The imitation cheese composition of claim 1 wherein the starch is an oxidized starch made by reaction of starch with sodium hypochlorite.

20. The imitation cheese composition of claim 1 wherein the starch is a cross-linked starch wherein the cross-linking is made by reacting starch with a reagent selected from the group consisting of phosphorous oxychloride, sodiumtrimeta phosphate and adipic anhydride.

21. The imitation cheese composition of claim 1 wherein the starch has an amylose content of less than 30%.

22. The imitation cheese composition of claim 1 wherein the starch comprises an acid converted starch.

23. An imitation cheese composition having the body, texture and eating qualities of natural dairy cheese comprising:
   a) about 3% to about 30% granular starch;
   b) about 0% to about 30% edible lipid material;
   c) about 20% to about 60% water;
   d) about 0.5% to about 25% non-starch carbohydrates; and
   e) about 0.5% to about 5% hydrocolloid stabilizers;
   f) wherein the composition contains less than 1% casein protein.

24. The imitation cheese composition of claim 23 wherein the composition comprises about 12% to about 25% starch.

25. The imitation cheese composition of claim 23 wherein the composition comprises about 0.5% to about 2.5% hydrocolloid stabilizer.

26. The imitation cheese composition of claim 23 wherein the composition comprises about 35% to about 60% water.

27. The imitation cheese composition of claim 23 wherein the composition comprises about 10% to about 25% edible lipid material.

28. The imitation cheese composition of claim 23 wherein the composition comprises about 5% to about 15% dried sweet whey powder.

29. The imitation cheese composition of claim 23 wherein the composition comprises about 10% corn syrup solids as the non-starch carbohydrate.

30. The imitation cheese composition of claim 24 wherein the composition comprises about 10% corn syrup solids as the non-starch carbohydrate.

31. The imitation cheese composition of claim 24 wherein the starch has an amylose content of less than about 40%.

32. The imitation cheese composition of claim 24 further comprising cheese color and cheese flavor.

33. The imitation cheese composition of claim 23 wherein the starch has an amylose content of less than 30%.

34. The imitation cheese composition of claim 23 wherein the starch comprises an acid converted starch.

35. The imitation cheese composition of claim 1 wherein the starch does not comprise hydroxyproplated starch.

* * * * *